United States Patent
Chen et al.

(10) Patent No.: US 11,878,479 B1
(45) Date of Patent: Jan. 23, 2024

(54) FILM WINDING ASSEMBLY AND WINDING METHOD FOR USE IN FIBER-REINFORCED PLASTIC TANK PRODUCTION

(71) Applicant: Jiangsu Ocean University, Jiangsu (CN)

(72) Inventors: Jinsong Chen, Jiangsu (CN); Zhenhao Huo, Jiangsu (CN); Qihao Yan, Jiangsu (CN); Changchang Ge, Jiangsu (CN); Weiyi Liu, Jiangsu (CN); Huangyu Wang, Jiangsu (CN); Ziyu Dong, Jiangsu (CN)

(73) Assignee: JIANGSU OCEAN UNIVERSITY, Jiangsu (CN)

( * ) Notice: Subject to any disclaimer, the term of this patent is extended or adjusted under 35 U.S.C. 154(b) by 0 days.

(21) Appl. No.: 18/257,577

(22) PCT Filed: Apr. 6, 2023

(86) PCT No.: PCT/CN2023/086600
§ 371 (c)(1),
(2) Date: Jun. 14, 2023

(30) Foreign Application Priority Data

Sep. 20, 2022 (CN) .......................... 202211142416.8

(51) Int. Cl.
*B29C 70/32* (2006.01)
*B65H 18/10* (2006.01)
*B29L 31/00* (2006.01)

(52) U.S. Cl.
CPC ............. *B29C 70/32* (2013.01); *B65H 18/10* (2013.01); *B29L 2031/7154* (2013.01); *B65H 2301/5115* (2013.01); *B65H 2403/92* (2013.01)

(58) Field of Classification Search
CPC ..................................................... B29C 70/32
See application file for complete search history.

(56) References Cited

FOREIGN PATENT DOCUMENTS

| CN | 107139502 A | 9/2017 |
| CN | 110316588 A | 10/2019 |
| CN | 210792064 U | 6/2020 |

(Continued)

OTHER PUBLICATIONS

Decision to Grant a Patent dated Mar. 17, 2023 issued in corresponding China Application No. 2022111424168 (with English translation).

*Primary Examiner* — Jeffry H Aftergut
(74) *Attorney, Agent, or Firm* — Muncy, Geissler, Olds & Lowe, P.C.

(57) ABSTRACT

A film winding assembly for use in FRP tank production includes a pedestal, two supporting bases are slidingly provided on the pedestal, translation assemblies engaging with the two supporting bases are provided on the pedestal, the two support bases are configured to be hollow, sliding plates are slidably connected in the two supporting bases, a plurality of cushioning springs are connected in between the sliding plates and the two supporting bases, fixing seats are connected on the sliding plates. With the winding assembly according to the present invention, vibration generated during winding can be efficiently cushioned, users can lock the tank body quickly, tediousness and manpower consumption due to manual locking can be avoided, furthermore, with the present assembly, during winding of the tank body, particles stained on the plastic film can be cleanly timely.

8 Claims, 4 Drawing Sheets

(56) References Cited

FOREIGN PATENT DOCUMENTS

| | | | |
|---|---|---|---|
| CN | 11358606 | A * | 12/2021 |
| CN | 113858606 | A | 12/2021 |
| CN | 216335504 | U | 4/2022 |
| CN | 216733079 | U | 6/2022 |
| JP | 2021-014106 | A | 2/2021 |

* cited by examiner

FILM WINDING ASSEMBLY AND WINDING METHOD FOR USE IN FIBER-REINFORCED PLASTIC TANK PRODUCTION

TECHNICAL FIELD

The present invention relates to the technical field of fiber-reinforced plastic tank (FRP tanks) manufacturing, especially to a film winding assembly for use in FRP tank production and winding method thereof.

BACKGROUND TECHNOLOGY

FRP tanks are a type of fiber-reinforced plastic products, FRP is a new composite material using glass fiber as a reinforcing agent and resin as a cementing agent and made by controlling a machine to wind with a microcomputer. FRP tanks are corrosion resistant, of high strength, light weight and long life, furthermore, with high design flexibility and good manufacturability and can be flexibly designed and used in different industries such as: chemical, environment protection, food and pharmaceutical fields, and are gradually occupying most of market segments of carbon steel and stainless steel.

Currently, for the FRP tanks, during curing and forming, usually it is necessary to wind plastic films over the cured tank bodies so as to form the tank and promise use smoothness of the tank bodies, at present, to wind the plastic around the tank bodies, usually clamping bands are used manually to fix the tank bodies on drive shafts so as to control the tank bodies to rotate and wind the plastic films around, the entire process is complicated and manpower consuming, in the meanwhile, during winding, surfaces of the plastic films cannot be cleaned efficiently, when there are particles of foreign matters on the surfaces of the plastic films, gaps will be formed in between the laminated plastic films, resulting in poor lamination.

Therefore, we propose a winding assembly for use in FRP tank production and winding method thereof.

SUMMARY OF INVENTION

A purpose of the present invention is to address the foregoing problems and provide a winding assembly for use in FRP tank production and winding method thereof.

To achieve the foregoing purpose, the present invention provides the following technical solutions: a winding assembly for use in FRP tank production, comprising a pedestal, two supporting bases are slidingly provided on the pedestal, translation assemblies engaging with the two supporting bases are provided on the pedestal, the two support bases are configured to be hollow, sliding plates are slidably connected in the two supporting bases, a plurality of cushioning springs are connected in between the sliding plates and the two supporting bases, fixing seats are connected on the sliding plates, upper ends of the fixing seats pass through the two supporting bases, rotation shafts are rotatably connected with the fixing seats, a drive mechanism engaging with the rotation shafts is provided on one of the fixing seats, locking seats are connected with the rotation shafts, locking mechanisms are provided on the locking seats, a hollow cavity is provided on the pedestal, two threaded supports are connected rotatably in the hollow cavity, threaded supporting rods are connected on the two threaded supports via threads, a dust suction seat is connected on the threaded supporting rods, a dust suction chamber is provided in the dust suction seat, at least one dust collector is provided on the pedestal, the at least one dust collector is communicated with the dust suction chamber via at least one suction pipe, at least one control mechanism engaging with the threaded supports is provided on the pedestal, and power control mechanisms are respectively provided in between the supporting bases and the fixing seats for engagement with the at least one control mechanism;

the control mechanisms comprise respectively an adjusting chamber, a second electromagnetic plate, a second permanent magnetic plate, a gear rod and a transmission gear, the adjusting chamber is provided at a side of the hollow cavity, the second electromagnetic plate is fixed in the adjusting chamber, the second electromagnetic plate is connected with the second permanent magnetic plate via a plurality of telescopic springs, the second permanent magnetic plate is connected with the adjusting chamber slidably, the gear rod is provided on the second permanent magnetic plate, an end of the gear rod extends into the adjusting chamber, the transmission gear is sleeved on the corresponding threaded supports and the transmission gear engages with the gear rod. the power control mechanisms comprise respectively at least one sliding rheostat and at least one guiding block, wherein the at least one sliding rheostat and the at least one guiding block are fixed in the supporting bases, the at least one guiding block is fixed on the fixing seats and an end of the at least one guiding block far away from the fixing seats is fixedly connected with a sliding end of the at least one sliding rheostat, and the at least one sliding rheostat is electrically connected with the corresponding second electromagnetic plate.

In the foregoing winding assembly for use in FRP tank production, the translation assemblies comprise two air cylinders, the two air cylinders are respectively provided at both sides of the pedestal, output ends of the two air cylinders are respectively connected with the supporting bases.

In the winding assembly for use in FRP tank production, the drive mechanism comprises a drive motor and a bevel gear component, wherein the drive motor is provided on one of the fixing seats, a drive cavity is provided in the fixing seat, an end of the rotation shaft on the fixing seat extends into the drive cavity and is transmissively connected with an output end of the drive motor.

In the winding assembly for use in FRP tank production, the locking mechanisms comprise respectively a first electromagnetic plate, two first permanent magnetic plates and two rivet holders, a control chamber is provided respectively in the locking seats, the first electromagnetic plate is provided in the control chamber and the two first permanent magnetic plates are provided slidably in the control chamber, a plurality of offset springs are provided in between the first permanent plates and the control chamber, upper ends of the rivet holders pass the locking seat and a plurality of suction discs are provided thereon.

In the winding assembly for use in FRP tank production, air pipes are provided on the rivet holders, the air pipes are communicated with the suction discs and normally open solenoid valves are provided on the air pipes.

In the winding assembly for use in FRP tank production, damping layers are provided on both sides of the sliding plates, and the damping layers contact and are connected with inner surfaces of the supporting bases.

In the winding assembly for use in FRP tank production, the at least one suction pipe is communicated with the dust suction chamber via corrugated telescopic tubes.

A winding method for use in FRP tank production, wherein the method comprises the following steps:

S1: for conducting winding work, first of all, controlling the two supporting bases to slide close via the two air cylinders, so that the rotation shafts and the locking seats on the two supporting bases are inserted into a tank body, thereafter, starting the first electromagnetic plates and the normally open solenoid valves, after energizing, the normally open solenoid valves will be automatically closed, closing the air pipes, after energizing, the first electromagnetic valves will generate magnet and repulse the first permanent magnetic plates at both sides, so that the two rivet holders drive the suction discs to stick against an inner surface of the tank body, meanwhile, the suction discs will be absorbed on the tank body to promise locking stability;

S2: after locking the tank body, fixing a side of plastic film to be wound on the tank body, thereafter, starting the drive motor, with transmission collaboration of the bevel gear component, the drive motor will drive the rotation shafts to rotate, the rotation shafts will drive the tank body to rotate, the tank body during rotation will wind the plastic film, during winding, starting the dust collector and the dust collector will suck dust on and clean a surface of the plastic film via collaboration of the dust collector, the corrugated telescopic tubes and the dust suction chamber on the dust suction seat; and S3: when a weight of the fixing seats become higher due to vibration or winding of the plastic film on the tank body, and the fixing seats move, the at least one sliding block on the at least one sliding rheostat will move synchronously, when the sliding rheostat moves downwards, electric resistance entering the second electromagnetic plates will be reduced, at this time, electric current flowing into the second electromagnetic plates will increase, magnet performance of the second electromagnetic plate will increase, the second electromagnetic plates will repulse the second permanent magnetic plates, the gear rods will move, with transmission cooperation of the transmission gears, the threaded supports will rotate, the dust suction seats will move downwards automatically so as to maintain a gap to the tank body, similarly, when the at least one sliding block on the at least one sliding rheostat moves upwards the dust suction seats will move upwards automatically.

Compared with the prior art, beneficial effects of the present invention are: by collaboration of the cushioning springs and the fixing seats, vibration generated during winding will be cushioned automatically, further, with the configuration of the locking mechanisms, the tank body can be rapidly fixed, so that it is no longer necessary to lock the tank body manually, in the meanwhile, the locking position is hidden in the tank body, and will not affect winding of the tank body, by engagement of the dust collector and the dust suction seat, the plastic film can be cleaned efficiently during winding of the tank body, adverse effects of attachment of foreign matters and particles on the plastic film on the winding is avoided, in addition, with the additionally provided power control mechanism, the current flowing into the control mechanism can be controlled automatically on the basis of the vibration magnitude of the fixing seats and downward movement of the fixing seats due to weight increase of the tank body resulting from winding of the plastic film, in this way, the distance between the dust suction seats and the tank body can be controlled automatically, the dust collector can be maintained at a proper distance to clean the plastic film wound on the tank body so as to avoid too big gap from the tank body or contacting the plastic film.

In summary, with the technical solutions in the present invention, vibration generated during winding can be efficiently cushioned, in the meantime, it is convenient for users to fix quickly the tank body with the present device, tediousness and manpower consumption due to manual locking is avoided, in addition, during winding, the present device has been provided with at least one dust collector to clean particles stained on the plastic film, and the dust suction seats can control automatically the distance to the tank body, the dust suction seat can conduct dust collection work to a better extent.

Figure 1:
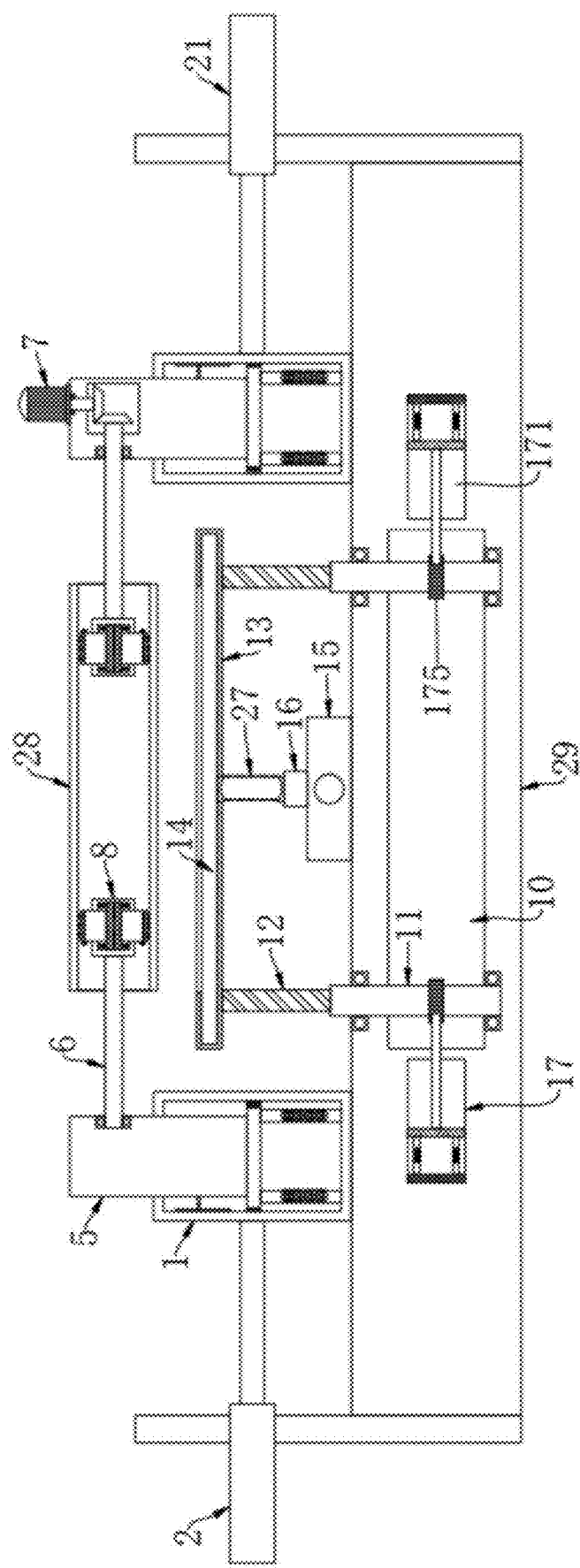
FIG. 1 is a perspective view of a film winding assembly for use in FRP tank production and winding method thereof according to the present invention.

In the drawings: 1 supporting base; 2 translation assembly; 201 air cylinder; 3 sliding plate; 4 cushioning spring; 5 fixing seat; 6 rotation shaft; 7 drive mechanism; 71 drive motor; 72 bevel gear component; 8 locking seat; 9 locking mechanism; 91 first electromagnetic plate; 92 first permanent magnet plate; 93 rivet holder; 10 hollow cavity; 11 threaded support; 12 threaded supporting rod; 13 dust suction seat; 14 dust suction chamber; 15 dust collector; 16 dust suction tube; 17 control mechanism; 171 adjusting cavity; 172 second electromagnetic plate; 173 second permanent magnetic plate; 174 gear rod; 175 drive gear; 18 power control mechanism; 181 sliding rheostat; 182 guiding block; 19 drive chamber; 20 control cavity; 21 offset spring; 22 suction disc; 23 air pipe; 24 solenoid valve; 25 telescopic spring; 26 damping layer; 27 corrugated telescopic tube; 28 tank body and 29 pedestal.

EMBODIMENTS

The following embodiments are explanatory and not intended to limit the scope of the present invention.

Figure 2:
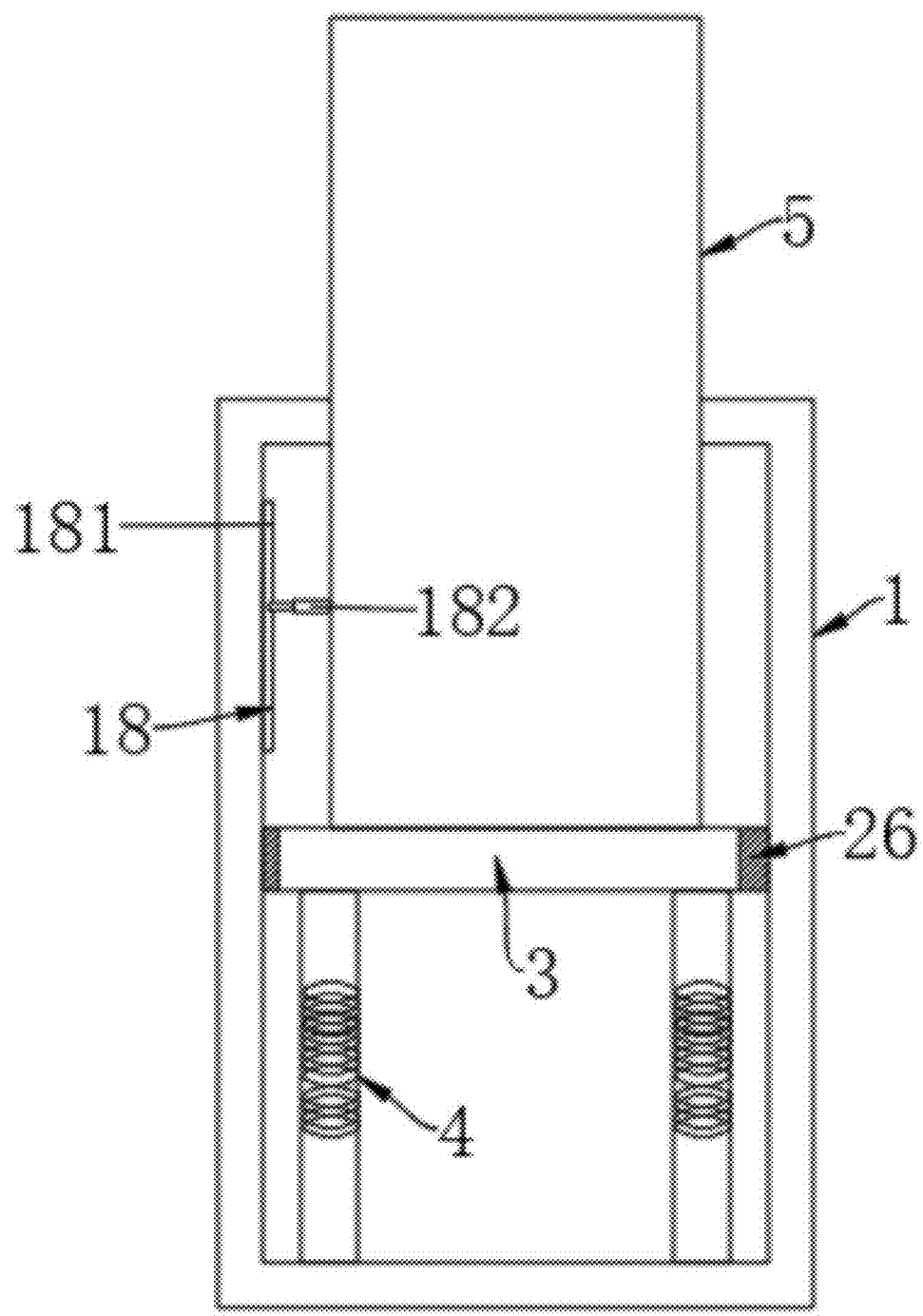
FIG. 2 is a structural diagram showing mutual collaboration of supporting bases and fixing seats of the film winding assembly for use in FRP tank production and winding method thereof according to the present invention.
Figure 3:
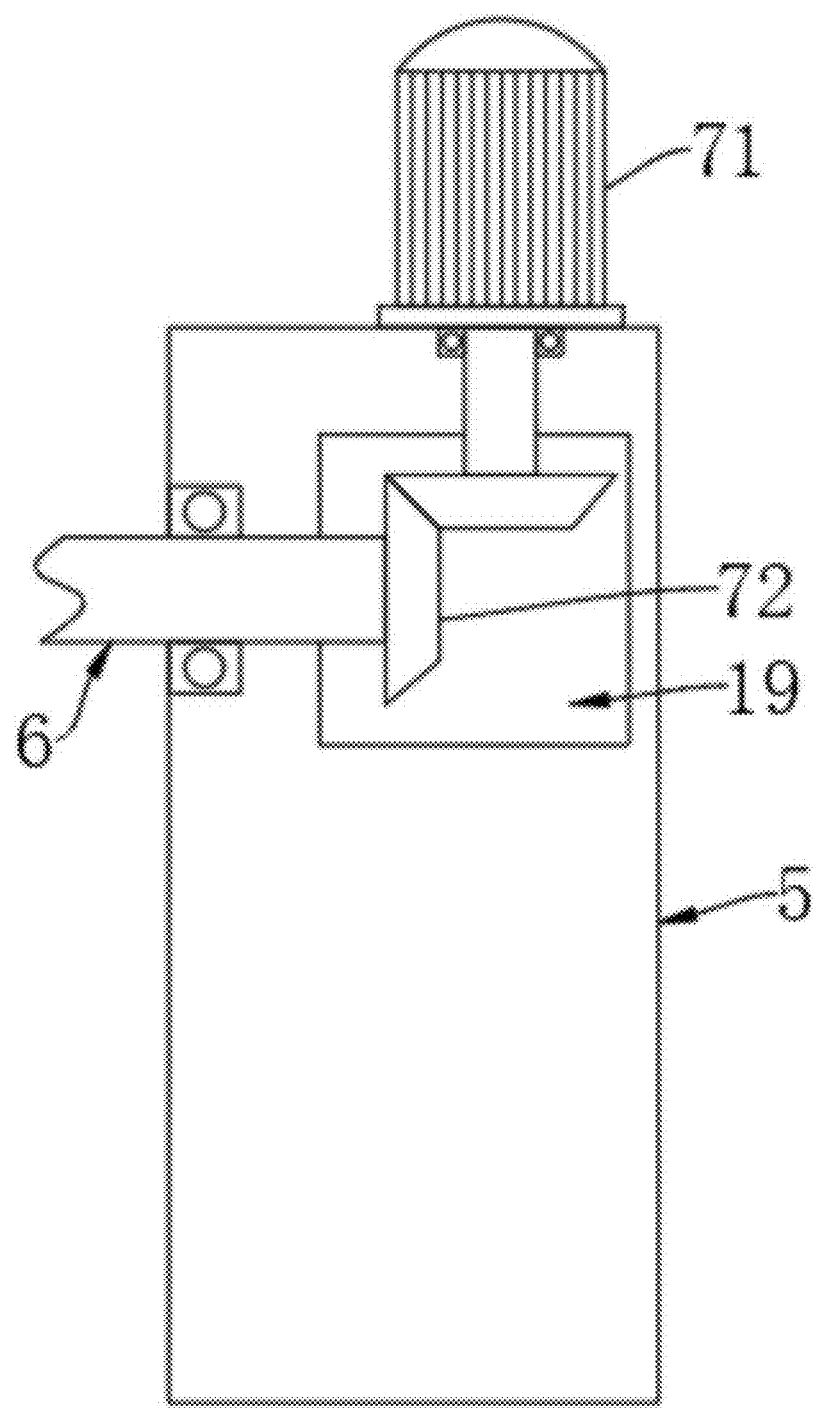
FIG. 3 is a structural diagram showing mutual collaboration of drive mechanisms and the fixing seats of the film winding assembly for use in FRP tank production and winding method thereof according to the present invention.
Figure 4:
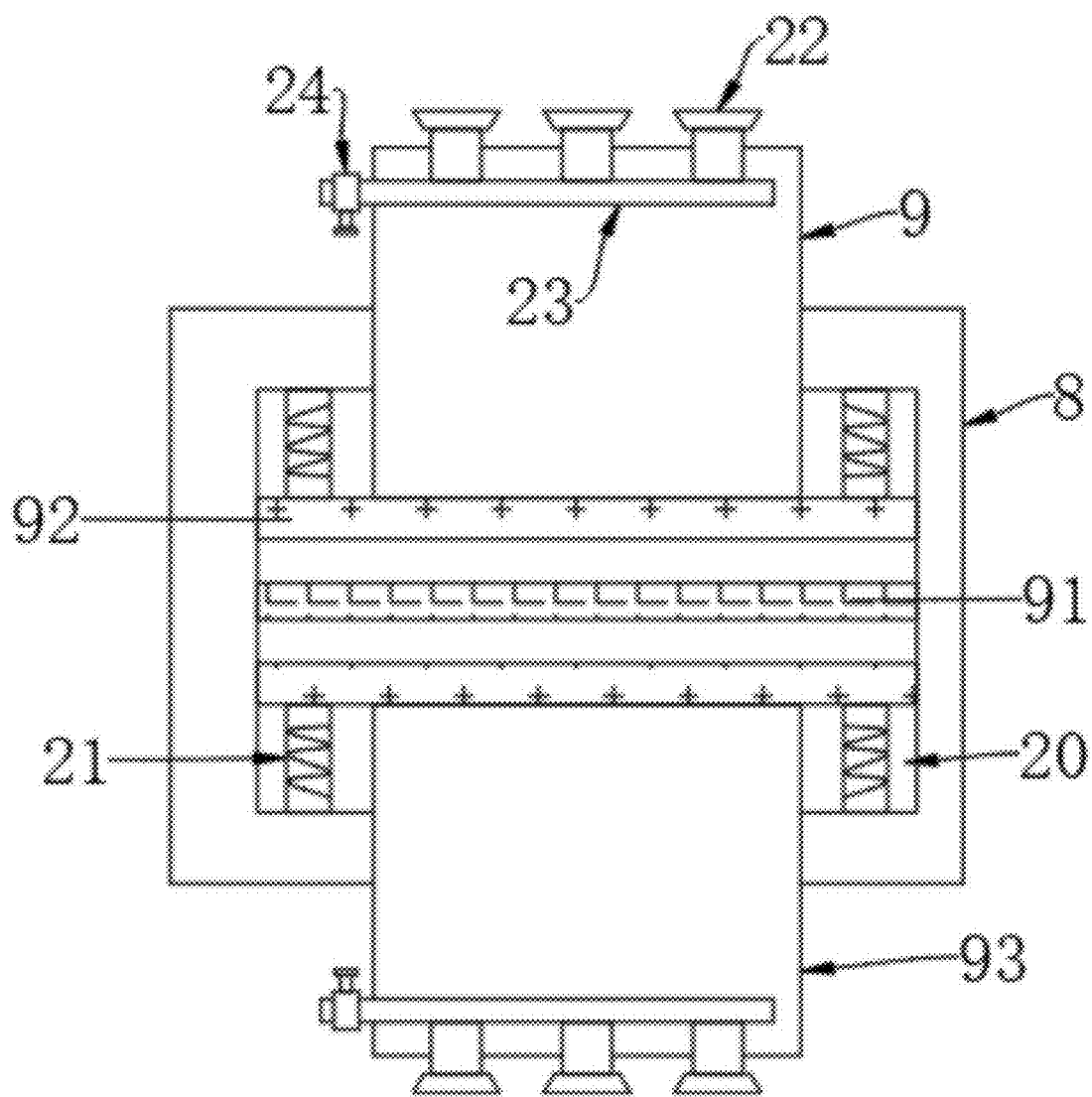
FIG. 4 is a perspective structural diagram showing locking seats of the film winding assembly for use in FRP tank production and winding method thereof according to the present invention.
Figure 5:
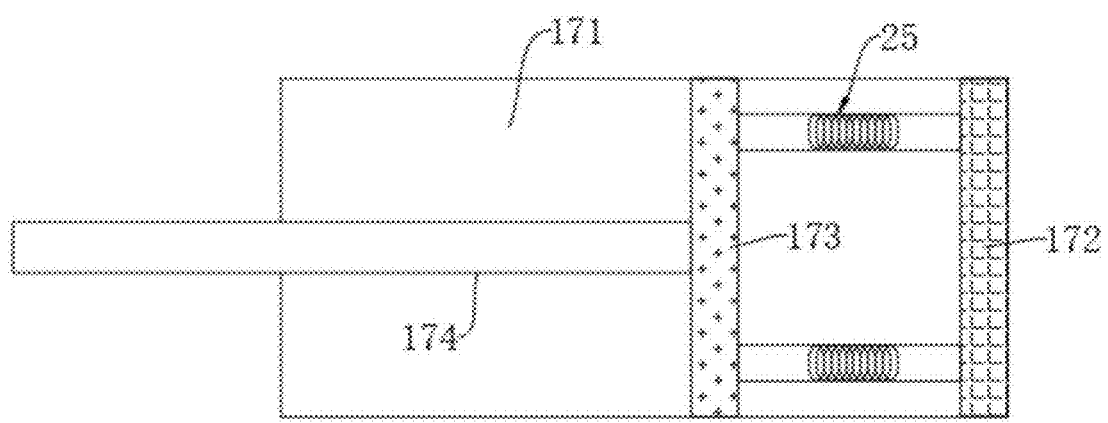
FIG. 5 is an internal structural diagram showing adjusting cavities of the winding assembly for use in FRP tank production and winding method thereof according to the present invention.

As shown in FIGS. 1-5, a film winding assembly for use in FRP tank production, comprises a pedestal 29, two supporting bases 1 are provided slidably on the pedestal 1, translation assemblies 2 engaging with the two supporting bases 1 are provided on the pedestal 1, the translation assemblies 2 comprise two air cylinders 201, the two air cylinders are provided on both sides of the pedestal 29, output ends of the two air cylinders 201 are respectively connected with corresponding supporting bases 1, and by configuration of the air cylinders 201, movement of the supporting bases 1 can be controlled so as to place or take a tank body 28;

The supporting bases 1 are designed to be hollow, sliding plates 3 are slidably connected in the supporting bases 1, a plurality of cushioning springs 4 are connected in between the sliding plates 3 and the supporting bases 1, fixing seats are connected on the sliding plates 3, upper ends of the fixing seats 5 pass through the supporting bases 1, damping layers 26 are provided on both sides of the sliding plates 3, the damping layers 26 contact and are connected with inner surfaces of the supporting bases 1, and by configuration of the damping layers 26, damping properties of the damping layers 26 are utilized to counter vibration generated by release of the cushioning springs 4; Rotation shafts 6 are respectively rotatably connected on the two fixing seats 5, a drive mechanism 7 engaging with the rotation shafts 6 is provided on one of the two fixing seats 5, the drive mechanism 7 comprises a drive motor 71 and a bevel gear component 72, wherein the drive motor 71 is fixedly provided on one of the fixing seats 5, a drive cavity 19 is opened in one of the fixing seats, one end of the rotation shaft 6 on the fixing seat 5 extends into the drive cavity 19 and is transmissively connected with an output end of the drive motor 71 via the bevel gear component 72, and by transmission engagement of the bevel gear component 72, the drive motor 71 can drive the rotation shafts 6 to rotate;

Locking seats 8 are connected with the rotation shafts 6, locking mechanism 9 are provided on the locking seats 8, the locking seats 8 comprise respectively a first electromagnetic plate 91, two first permanent magnetic plates 92 and two rivet holders 93, control cavities 20 are opened in the locking seats 8, the first electromagnetic plates 91 are fixed in the control cavities 20, the first permanent magnetic plates 92 are slidably provided in the control cavities 20, a plurality of reset springs 21 are connected in between the first permanent magnetic plates 92 and the control cavities 20, upper ends of the rivet holder 93 pass through the locking seats 8 and are fixedly provided with a plurality of suction discs 22, by configuration of the first electromagnetic plates 91, in combination with magnetic changes resulting from switching on and off and the first permanent magnetic plates 92, the rivet holders 93 are controlled to stretch or retract, and by configuration of the suction discs 22, the locking seats 8 can be absorbed on an inner surface of the tank body 28 to promise locking stability;

Air pipes 23 are provided on the rivet holders 93, the air pipes 23 communicate with the suction discs 22, normally open solenoid valves 24 are provided on the air pipes, by configuration of the solenoid valve, the air pipes 23 can be controlled to open or close so as to control communication of the suction discs 22 with the foreign world and facilitate absorption states of the suction discs 22;

A hollow cavity 10 is provided in the pedestal 29, two threaded supports 11 are connected rotatably in the hollow cavity 10, threaded supporting rods 12 are connected with respectively the threaded supports 11, the two threaded supporting rods 12 are jointly connected with a dust suction seat 13, a dust suction chamber 14 is provided in the dust suction seat 13, a dust collector 15 is provided on the pedestal 29, the dust collector 15 communicates with the dust suction chamber 14 via the suction discs 16, the suction discs 16 communicate with the dust suction chamber 14 via corrugated telescopic tubes 27, in this way, by extension and retraction of the corrugated telescopic tubes 27 obstruction of vertical movement of the dust suction seat 13 can be avoided; control mechanisms 17 engaging with the threaded support 11 are provided on the pedestal 29, the control mechanisms 17 comprise respectively an adjusting cavity 171, a second electromagnetic plate 172, a second permanent magnetic plate 173, a gear rod 174 and a transmission gear 175, the adjusting cavity 171 is provided at one side of the hollow cavity 10, the second electromagnetic plate 172 is provided in the adjusting cavity 171, the second electromagnetic plates 172 is connected with the second permanent magnetic plate 173 via a plurality of telescopic springs 25, the second permanent magnetic plate 173 is connected with the adjusting cavity slidably, the gear rod 174 is provided on the second permanent magnetic plate 173, an end of the gear rod 174 extends into the adjusting cavity 171, the transmission gear 175 is sleeved over the corresponding threaded support 11, the transmission gear 175 engages with the gear 174, and by engagement of the second electromagnetic plates 172, the second permanent magnetic plates 173 and the telescopic springs 25, the magnetic strength of the second electromagnetic plates 172 will change depending on how much current flows therein, and by cooperation of transmission of the gear rods 174 and the gears 175, the threaded supports 11 are controlled to rotate so as to control the threaded supporting rods 12 to stretch or retract;

power control mechanisms 18 engaging with the control mechanisms 17 are provided in between the supporting bases 1 and the fixing seats 5, the power control mechanisms 18 comprise sliding rheostats 181 and guiding blocks 182, the sliding rheostats 181 are provided in the corresponding supporting bases 1, the guiding blocks 182 are provided on the corresponding fixing seats 5, ends of the guiding blocks 182 far from the fixing seats 172 are connected with sliding ends of the sliding rheostats 181, the sliding rheostats 181 are electrically connected with the corresponding second electromagnetic plates 172, by configuration of the guiding blocks 182, sliding blocks on the sliding rheostats 181 can move along with movement of the fixing seats 5 so as to change automatically impedance of the sliding rheostats 181 in the circuit.

Hereinafter operation principles of the present invention are described in the following paragraphs:

When conducting winding work, first of all control the two supporting bases 1 to slide close to each other with the two air cylinders 201, the rotation shafts 6 on the two supporting bases 1 and the locking seats 8 are inserted into the tank body 28, thereafter, start the first electromagnetic plates 91 and the normally open solenoid valves 24, after energizing, the normally open solenoid valves 24 will be switched off automatically, close the air pipes 23, after energizing, the first electromagnetic valves 24 will generate magnet and repulse the first permanent magnetic plates 92 at both sides, so that the rivet holders will drive the suction discs 22 to rest on the inner surface of the tank body 28, in the meanwhile, the suction discs 22 will be absorbed on the tank body 28, thus locking stability is promised;

After locking the tank body 28, fix a side of the plastic film to be wound on the tank body 28, start the drive motor 71, with the cooperation of the bevel gear component 72, the drive motor 71 will control the rotation shaft 6 to rotate, the rotation shafts 6 will drive the tank body 28 to rotate, the tank body 28 will wind the plastic film during rotation, and during rotation, start the dust collector 15, the dust collector 15 will absorb dust on the surface of the plastic film by collaboration with the corrugated telescopic tubes 27 and the dust suction chamber 13 on the dust suction seat 13;

When weight of the fixing bases 5 is increased due to vibration or winding of the plastic film around the tank body, and the fixing bases 5 move consequently, the sliding blocks on the sliding rheostats 181 will move synchronously, when the sliding rheostats 181 move downwards, impedance of the second electromagnetic plates 172 will be reduced, the current flowing into the second electromagnetic plates 172 will rise, so that the magnetic strength of the second electromagnetic plates 172 will increase, the second electromagnetic plates 172 will repulse the second permanent magnetic plates 173, the gear rods 174 will move, with the cooperation of the transmission gears 175, the threaded supports 11 will rotate, the dust suction seat 13 will move downwards driven by the threaded supporting rods 12 so as to maintain a distance to the tank body 28, similarly, when the sliding blocks on the sliding rheostats 18 move upwards, the dust suction seat 13 will move upwards automatically.

The foregoing are only some preferred embodiments of the present invention and are not intended to limit the present invention, all modifications, equivalent replacement and improvement made with the spirit and the principle of the present invention shall be covered in the protection scope of the present invention.

The invention claimed is:

1. A winding assembly for use in FRP tank production, comprising a pedestal, two supporting bases are slidingly provided on the pedestal, translation assemblies engaging with the two supporting bases are provided on the pedestal, the two support bases are configured to be hollow, sliding plates are slidably connected in the two supporting bases, a plurality of cushioning springs are connected in between the sliding plates and the two supporting bases, fixing seats are connected on the sliding plates, upper ends of the fixing seats pass through the two supporting bases, rotation shafts are rotatably connected with the fixing seats, a drive mechanism engaging with the rotation shafts is provided on one of the fixing seats, locking seats are connected with the rotation shafts, locking mechanisms are provided on the locking seats, a hollow cavity is provided on the pedestal, two threaded supports are connected rotatably in the hollow cavity, threaded supporting rods are connected on the two threaded supports via threads, a dust suction seat is connected on the threaded supporting rods, a dust suction chamber is provided in the dust suction seat, at least one dust collector is provided on the pedestal, the at least one dust collector is communicated with the dust suction chamber via at least one suction pipe, at least one control mechanism engaging with the threaded supports is provided on the pedestal, and power control mechanisms are respectively provided in between the supporting bases and the fixing seats for engagement with the at least one control mechanism;

the control mechanisms comprise respectively an adjusting chamber, a second electromagnetic plate, a second permanent magnetic plate, a gear rod and a transmission gear, the adjusting chamber is provided at a side of the hollow cavity, the second electromagnetic plate is fixed in the adjusting chamber, the second electromagnetic plate is connected with the second permanent magnetic plate via a plurality of telescopic springs, the second permanent magnetic plate is connected with the adjusting chamber slidably, the gear rod is provided on the second permanent magnetic plate, an end of the gear rod extends into the adjusting chamber, the transmission gear is sleeved on the corresponding threaded supports and the transmission gear engages with the gear rod;

the power control mechanisms comprise respectively at least one sliding rheostat and at least one guiding block, wherein the at least one sliding rheostat and the at least one guiding block are fixed in the supporting bases, the at least one guiding block is fixed on the fixing seats and an end of the at least one guiding block far away from the fixing seats is fixedly connected with a sliding end of the at least one sliding rheostat, and the at least one sliding rheostat is electrically connected with the corresponding second electromagnetic plate.

2. The winding assembly for use in FRP tank production according to claim 1, wherein the translation assemblies comprise two air cylinders, the two air cylinders are respectively provided at both sides of the pedestal, output ends of the two air cylinders are respectively connected with the supporting bases.

3. The winding assembly for use in FRP tank production according to claim 1, wherein the drive mechanism comprises a drive motor and a bevel gear component, wherein the drive motor is provided on one of the fixing seats, a drive cavity is provided in the fixing seat, an end of the rotation shaft on the fixing seat extends into the drive cavity and is transmissively connected with an output end of the drive motor.

4. The winding assembly for use in FRP tank production according to claim 1, wherein the locking mechanisms comprise respectively a first electromagnetic plate, two first permanent magnetic plates and two rivet holders, a control chamber is provided respectively in the locking seats, the first electromagnetic plate is provided in the control chamber and the two first permanent magnetic plates are provided slidably in the control chamber, a plurality of offset springs are provided in between the first permanent plates and the control chamber, upper ends of the rivet holders pass the locking seat and a plurality of suction discs are provided thereon.

5. The winding assembly for use in FRP tank production according to claim 4, wherein air pipes are provided on the rivet holders, the air pipes are communicated with the suction discs and normally open solenoid valves are provided on the air pipes.

6. The winding assembly for use in FRP tank production according to claim 1, wherein damping layers are provided on both sides of the sliding plates, and the damping layers contact and are connected with inner surfaces of the supporting bases.

7. The winding assembly for use in FRP tank production according to claim 1, wherein the at least one suction pipe is communicated with the dust suction chamber via corrugated telescopic tubes.

8. A winding method for use in FRP tank production using the winding assembly according to claim 1, wherein the method comprises the following steps:

S1: for conducting winding work, first of all, controlling the two supporting bases to slide close via the two air cylinders, so that the rotation shafts and the locking seats on the two supporting bases are inserted into a tank body, thereafter, starting the first electromagnetic plates and the normally open solenoid valves, after energizing, the normally open solenoid valves will be automatically closed, closing the air pipes, after energizing, the first electromagnetic valves will generate magnet and repulse the first permanent magnetic plates at both sides, so that the two rivet holders drive the suction discs to stick against an inner surface of the tank body, meanwhile, the suction discs will be absorbed on the tank body to promise locking stability;

S2: after locking the tank body, fixing a side of plastic film to be wound on the tank body, thereafter, starting the drive motor, with transmission collaboration of the bevel gear component, the drive motor will drive the rotation shafts to rotate, the rotation shafts will drive the tank body to rotate, the tank body during rotation will wind the plastic film, during winding, starting the dust collector and the dust collector will suck dust on and clean a surface of the plastic film via collaboration of the dust collector, the corrugated telescopic tubes and the dust suction chamber on the dust suction seat; and S3: when a weight of the fixing seats become higher due to vibration or winding of the plastic film on the tank body, and the fixing seats move, the at least one sliding block on the at least one sliding rheostat will move synchronously, when the at least one sliding rheostat moves downwards, electric resistance entering the second electromagnetic plates will be reduced, at this time, electric current flowing into the second electromagnetic plates will increase, magnet performance of the second electromagnetic plates will increase, the second electromagnetic plates will repulse the second permanent magnetic plates, the gear rods will move, with transmission cooperation of the transmission gears, the threaded supports will rotate, the dust suction seats will move downwards automatically so as to maintain a gap to the tank body, similarly, when the at least one sliding block on the at least one sliding rheostat moves upwards the dust suction seats will move upwards automatically.

\* \* \* \* \*